(12) United States Patent
    Williams (10) Patent No.: US 7,316,180 B2
(45) Date of Patent: Jan. 8, 2008

(54) FRY POT SPLATTER SHIELD

(76) Inventor: Hilton A. Williams, 4016 Sun Valley Crescent, Chesapeake, VA (US) 23321

( * ) Notice: Subject to any disclaimer, the term of this patent is extended or adjusted under 35 U.S.C. 154(b) by 0 days.

(21) Appl. No.: 11/648,003

(22) Filed: Dec. 29, 2006

(65) Prior Publication Data

US 2007/0108217 A1    May 17, 2007

Related U.S. Application Data

(63) Continuation of application No. 11/077,769, filed on Mar. 12, 2005, now abandoned.

(51) Int. Cl.
    *A23L 1/00*    (2006.01)
(52) U.S. Cl. .............................. 99/403; 99/422; 99/645
(58) Field of Classification Search ................... 99/339, 99/403–418, 483, 422–425, 340, 444–450, 99/330–336; 126/369, 369.1, 369.2, 20; 220/912, 913; 426/510, 511, 523
    See application file for complete search history.

(56) References Cited

U.S. PATENT DOCUMENTS

| | | | | |
|---|---|---|---|---|
| 5,542,347 A | * | 8/1996 | Joseph | 99/422 |
| 6,167,799 B1 | * | 1/2001 | Macias | 99/413 |
| 6,269,737 B1 | * | 8/2001 | Rigney et al. | 99/339 |
| 6,314,869 B1 | * | 11/2001 | Bourgeois, Jr. | 99/340 |
| 6,446,545 B2 | * | 9/2002 | Rigney | 99/339 |
| 6,711,992 B1 | * | 3/2004 | McLemore | 99/413 |
| 6,941,857 B2 | * | 9/2005 | McLemore | 99/413 |

* cited by examiner

*Primary Examiner*—Timothy F. Simone
(74) *Attorney, Agent, or Firm*—Goldizen & Associates; Bradley D. Goldizen (57) ABSTRACT

A shield for a fry pot includes a sheet of rectangular, pliable metal that may be formed in a cylindrical shaping to overlap edges of the shield to create an outer diameter substantially equal to an inner diameter of the fry pot. A series of holes in the metal are provided for inserting at least one pair of supports therethrough. At least one of the supports extends through overlapping holes in the shield to secure it in place against an upper edge of a sidewall of the fry pot.

17 Claims, 8 Drawing Sheets

FRY POT SPLATTER SHIELD

This application is a continuation application of U.S. patent application Ser. No. 11/077,769 filed on Mar. 12, 2005 now abandoned.

The subject matter of the present invention did not receive federal government research and development funding.

BACKGROUND OF THE INVENTION

The present invention generally relates to a shield that attaches to a cooking pot. More particularly, the invention relates to a splatter shield that attaches to an upper edge or top of a pot containing oil and that is heated by an open flame.

It has become popular in recent years to cook turkeys in an oil filled pot known as a "fry pot." Usually a fry pot kit contains a 25 to 40 quart aluminum pot, lid, turkey stand (or basket), and a lift-hook to lower and raise the turkey into the oil. Many dangers exist when using oil filled pots over open flames.

Partially frozen turkeys placed into the fryer can cause the pot to overflow with hot oil. This is known as a spillover effect. Since the oil is combustible, a spillover effect may cause the oil to ignite. The ignition of the oil may cause other combustible materials to burn. If the cooking pot is over-filled with oil, the oil may spill out of the unit when the turkey is placed into the cooking pot. Oil may hit the burner/flames causing a fire to engulf the entire unit.

Another potential problem is the overheating of oil. Since most fry pots are not equipped with a thermostat, the user must either use a thermometer or guess at the temperature of the oil. If over heated, the oil has the potential to become combustible. Combustion of the oil be the source of a house fire or result serious burns to the user. House fires associated with turkey fryers are a leading source of injuries and property damage.

A further problem associated with the use of fry pots is splashing of hot oil onto the user when the turkey is lowered into or removed from the oil. Serious and even life threatening burns may result when this occurs.

The present invention aims to reduce the number of fires associated with the use of a fry pot, as well as the risk of injury to a user of a fry pot. All of the aforementioned problems are solved or diminished by the use of the instant invention.

SUMMARY OF THE INVENTION

The present invention is a splatter shield comprising a lightweight sheet of metal or other heat and flame resistant material that is fashioned in a manner to extend a sidewall of a fry pot. By extending the sidewall of the fry pot, the risk of spillover of hot oil is greatly diminished. Thus, the risks of personal injury and starting a fire are reduced when the present invention is utilized.

The splatter shield includes a pair of supports that communicate with an upper edge or lip of the fry pot to secure the shield in place during use. Holes are provided at predetermined distances around the shield to allow the shield to be adjusted for use with various sized fry pots. The shield includes two overlapping edges. A portion of at least one of the supports extends through overlapping adjustment holes to prevent the edges of the support from separating during use.

After use, the splatter shield may be easily disassembled, cleaned and stored inside the fry pot by simply disengaging the shield supports from the upper lip of the fry pot and removing them from the holes in the shield. The oil contained within the fry pot may then be drained and the interior of the pot wiped clean. Next, the ends of the shield are overlapped to create a cylinder having an exterior radius smaller than an interior radius of the pot. The shield is then deposited into the fry pot along with the shield supports. The lid is placed on top of the lip of the fry pot.

It is an object of the invention to provide a shield that extends the sidewall of a fry pot to prevent spillover of hot oil.

It is another object of the invention to provide a shield that is easily stored within the fry pot when not in use.

These and other objects of the invention and advantages of the invention will be set forth, appear in part or become apparent after considering the specification and accompanying drawings. It is to be realized that the following embodiments of the invention have been represented in their simplest form for ease in understanding the invention.

DETAILED DESCRIPTION OF THE INVENTION

The following is the preferred embodiment or best mode for carrying out the invention. It should be noted that this invention is not limited by the discussion of the preferred embodiment and should only be defined by the appended claims.

Figure 1A:
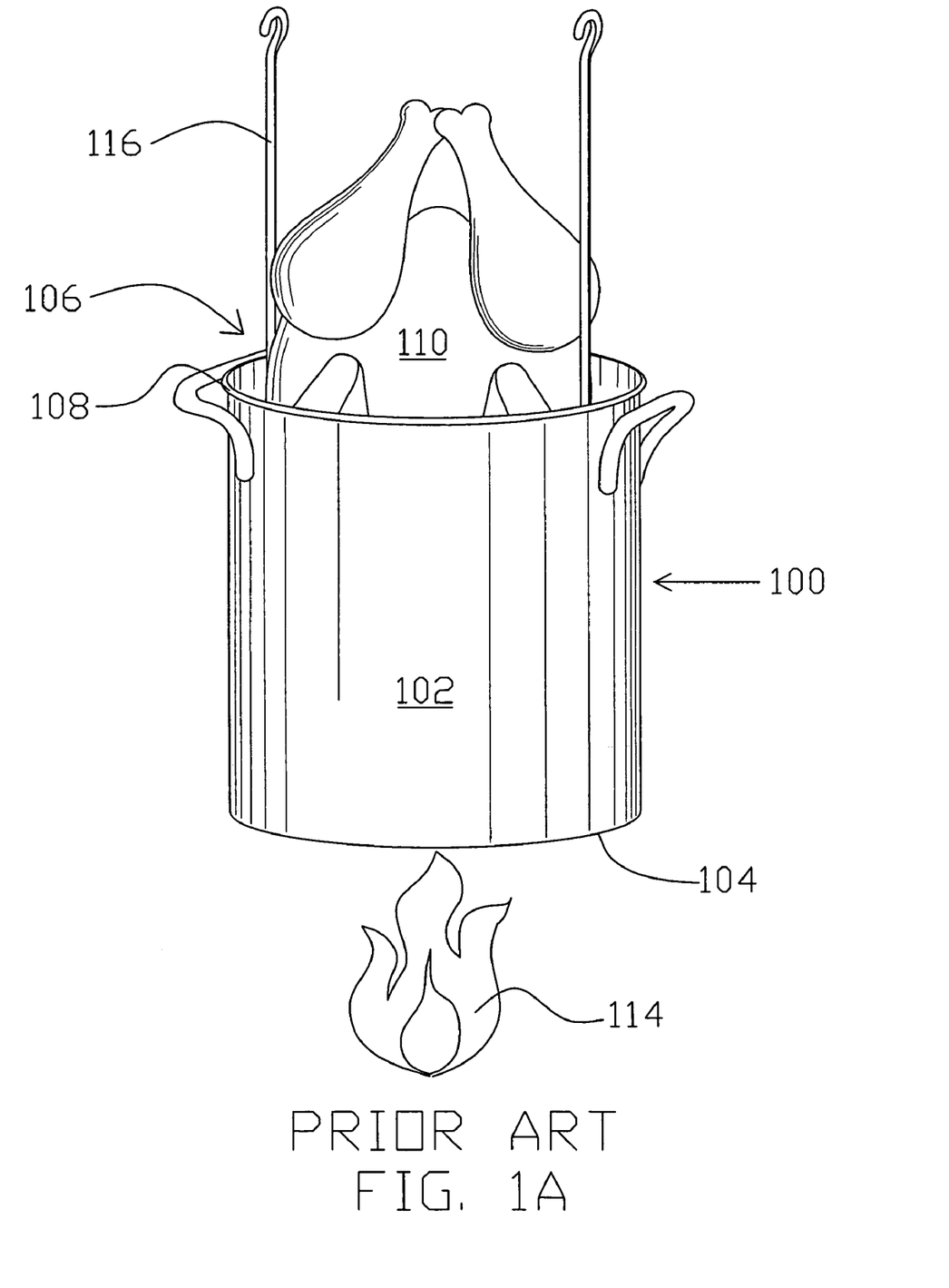
FIG. 1A is an elevation perspective view of a prior art fry pot and showing a turkey to be cooked in hot oil over a flame.
Figure 1B:
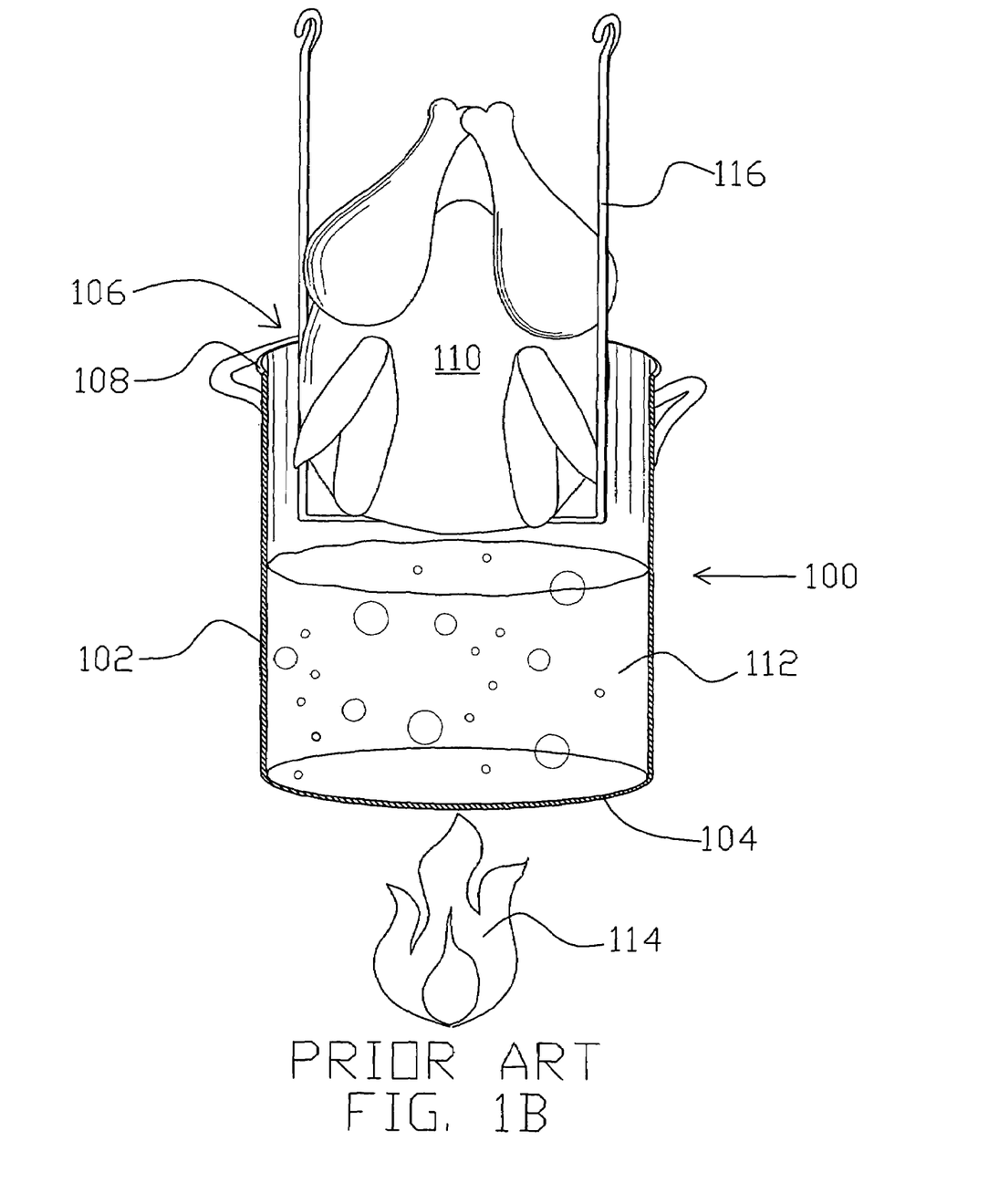
FIG. 1B is a cross-sectional view of FIG. 1B and showing the turkey positioned on a lifting rack above the hot oil.
Figure 1C:
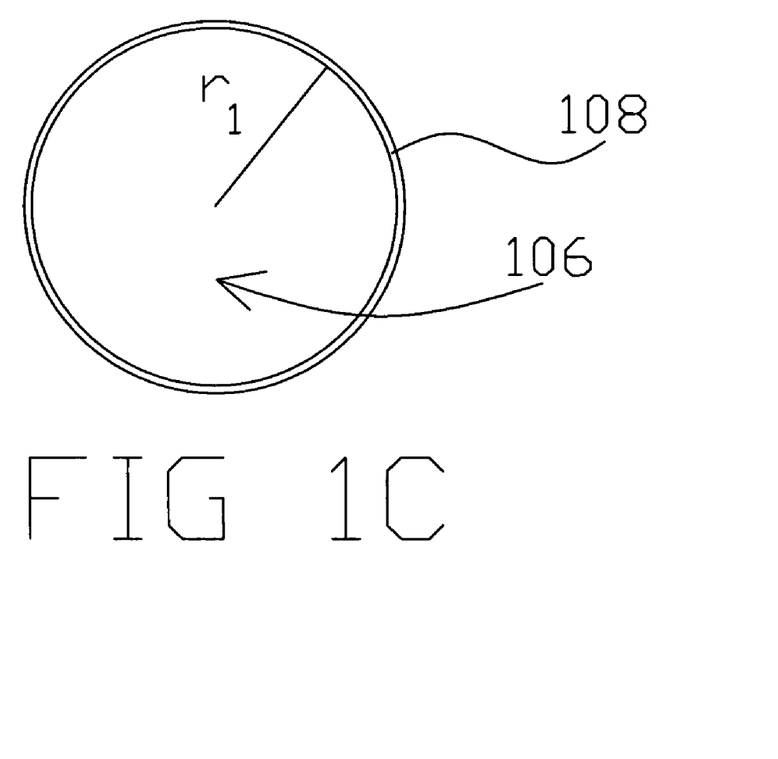
FIG. 1C is a plan view of the prior art fry pot of FIGS. 1A and 1B and showing the interior radius of the fry pot.

In FIGS. 1A and 1B, a turkey 110 is lowered into a fry pot 100 via a lifting rack 116. The fry pot 100 includes a sidewall 102 and bottom 104. A lip 108 defines an opening 106. This opening comprises a radius $r_1$, as shown in FIG. 1C. Oil 112 is heated through heat transferred from fire 114.

Figure 2:
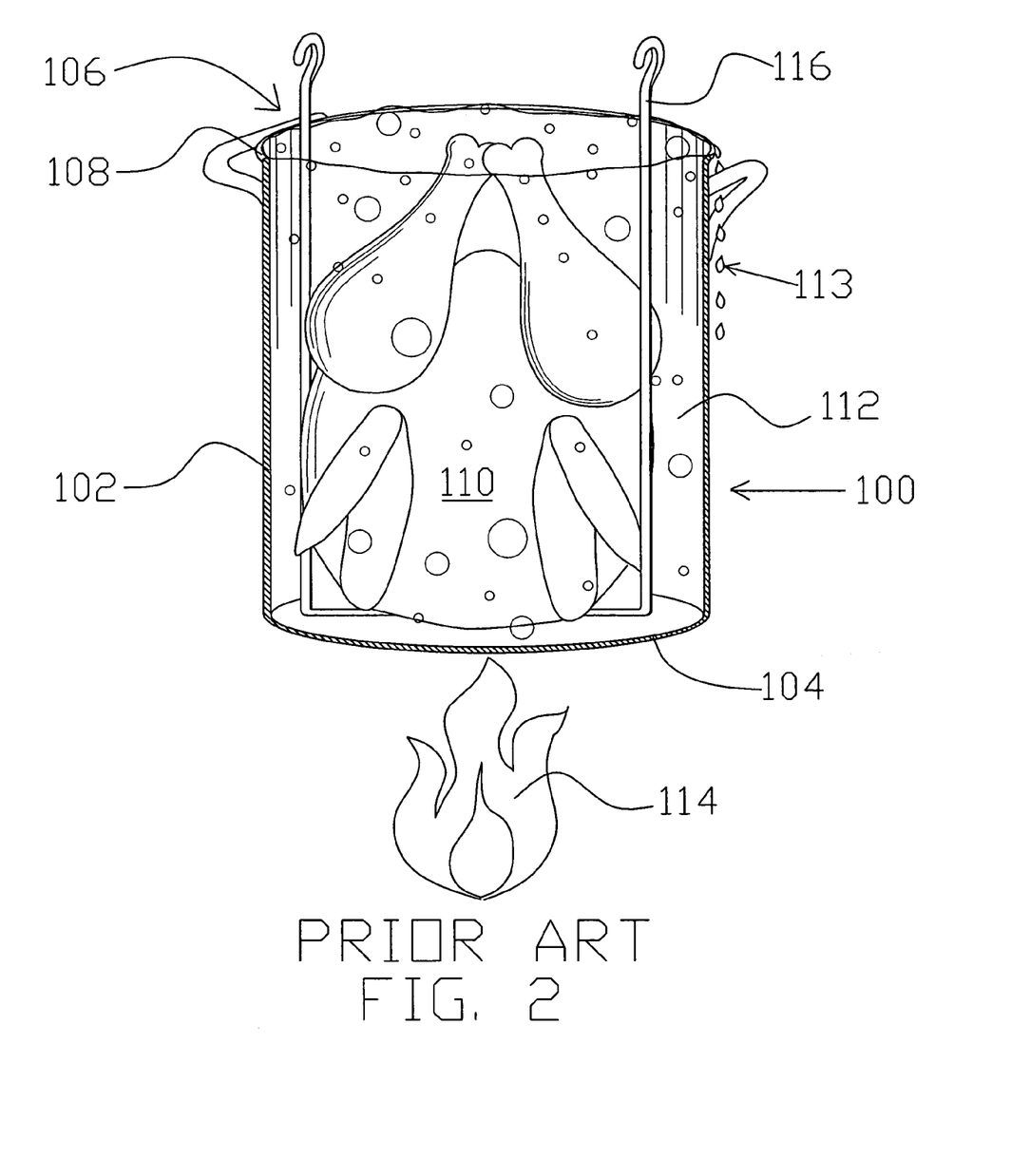
FIG. 2 is a cross-section view showing the turkey being lowered into the hot oil. Oil has spilled over a lip of the fry pot creating a hazardous condition.

FIG. 2 shows the turkey 110 being fully deposited into the pot 100. The amount of displacement created by the turkey 110 when initially deposited into the heated oil may cause spillover 113 of the oil to create a hazardous condition. For example, the spillover 113 may splash onto the user or cause a flash fire should it reach flames 114.

Figure 3:
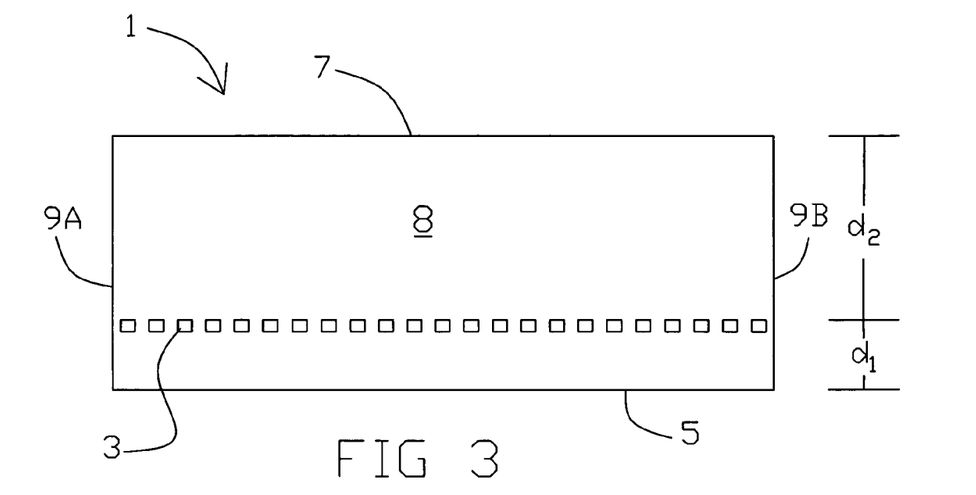
FIG. 3 is an elevation view of the present invention showing the shield in an unassembled manner.
Figure 4A:
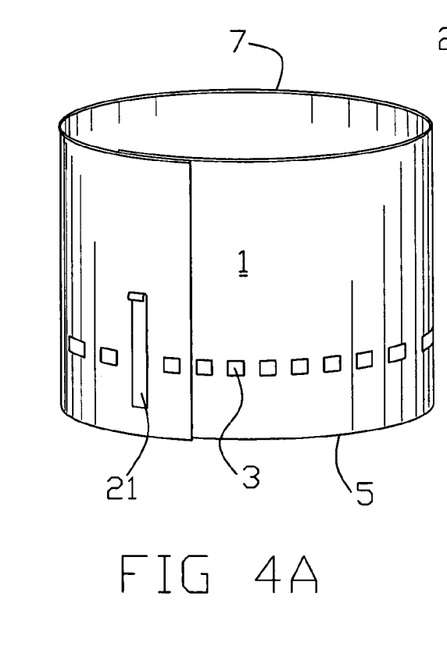
FIG. 4A is a perspective view of the present invention showing the shield configured for use.
Figure 4B:
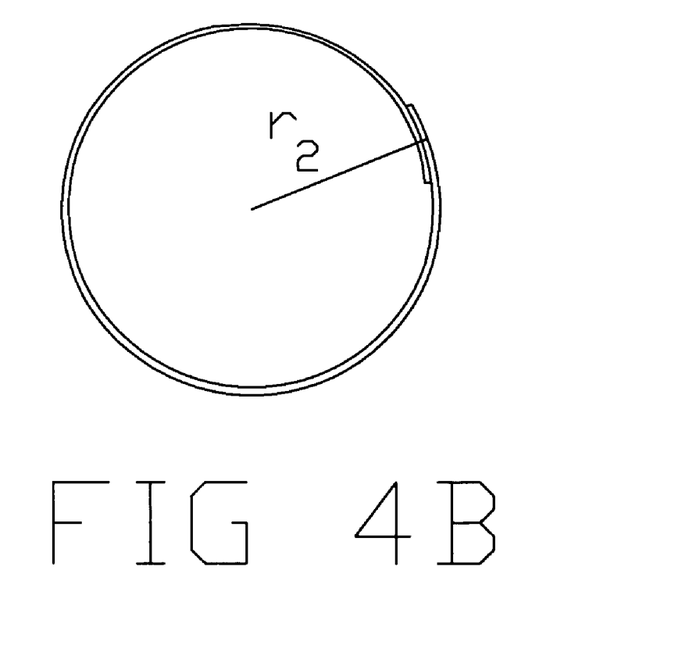
FIG. 4B is a plan view of the shield shown in FIG. 4A and showing the exterior radius of the shield.

FIGS. 3 and 4 show the instant invention. In FIG. 3, the shield 1 is shown in a flattened state. In FIG. 4, the shield 1 is assembled with the supports 21 shown in FIGS. 5A and 5B and ready for being attached to the lip 108 as shown in FIGS. 7A and 7B.

The shield 1 comprises a plurality of holes 3 arranged in a row across side 8 near bottom 5. Preferably, the distance between bottom 5 and the plurality of holes 3 is less than the distance between top 7 and the plurality of holes 3. That is, the distance $d_1$ defined between the plurality of holes 3 and bottom 5 is smaller than the distance $d_2$ defined between the plurality of holes 3 and top 7. The holes 3 are preferably square or rectangular in shape. Side 8 includes two ends 9A and 9B. These ends may be overlapped to create a cylindrically-shaped shield as shown in FIG. 4A. The ends 9 may be kept in an overlapping position by inserting a portion of support 21 through two overlapping holes, as shown in FIG. 4A. Typically, curved edge 25 is inserted into the overlapping holes.

Figure 5A:
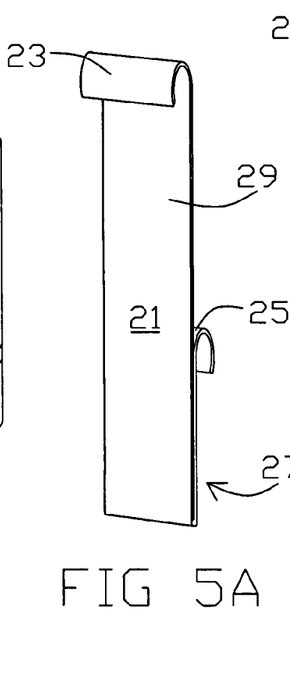
FIG. 5A is a perspective view of a shield support member.
Figure 5B:
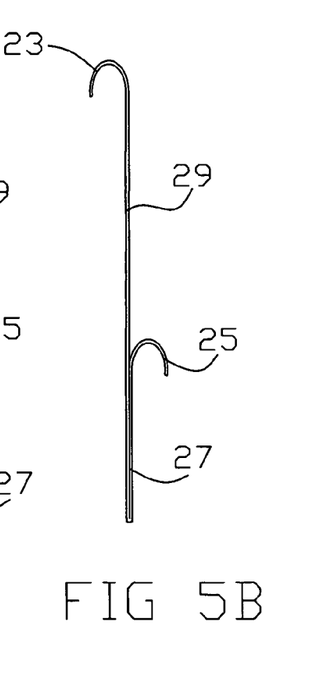
FIG. 5B is an elevation view of the shield support member shown in FIG. 5A.

The support 21 comprises a long side 29 including an upper curved edge 23 rolled or folded in a first direction. A short side 27 includes a lower curved edge 27 rolled in a second direction opposite the first direction, as shown. Preferably, the support 21 is formed from a single piece or strip of sheet metal. The sheet metal is folded to create a long side and short side. The end of each of these sides is rolled as shown in FIGS. 5A and 5B.

Figure 6:
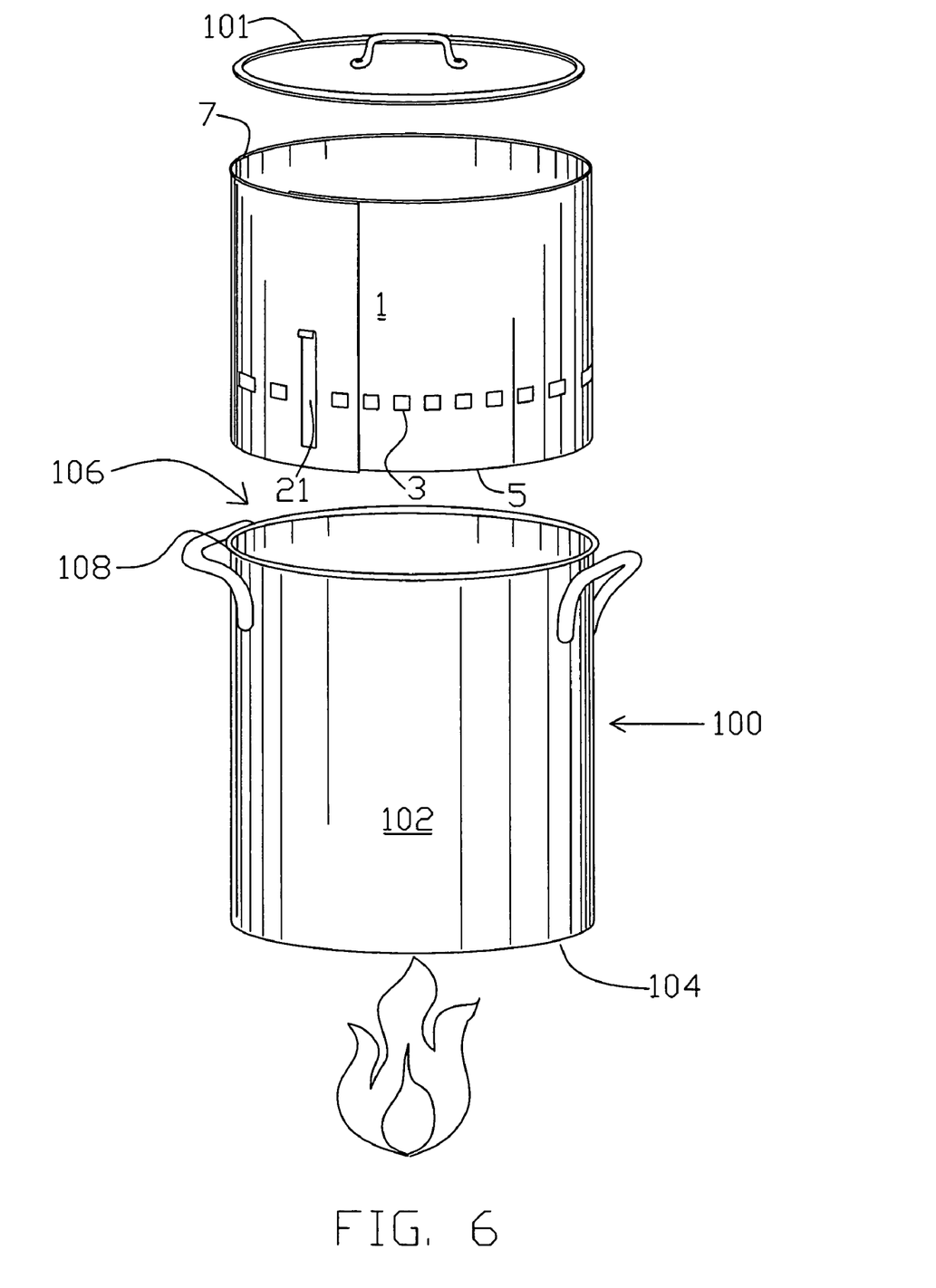
FIG. 6 is an exploded, perspective view of the shield, lid and fry pot.
Figure 7A:
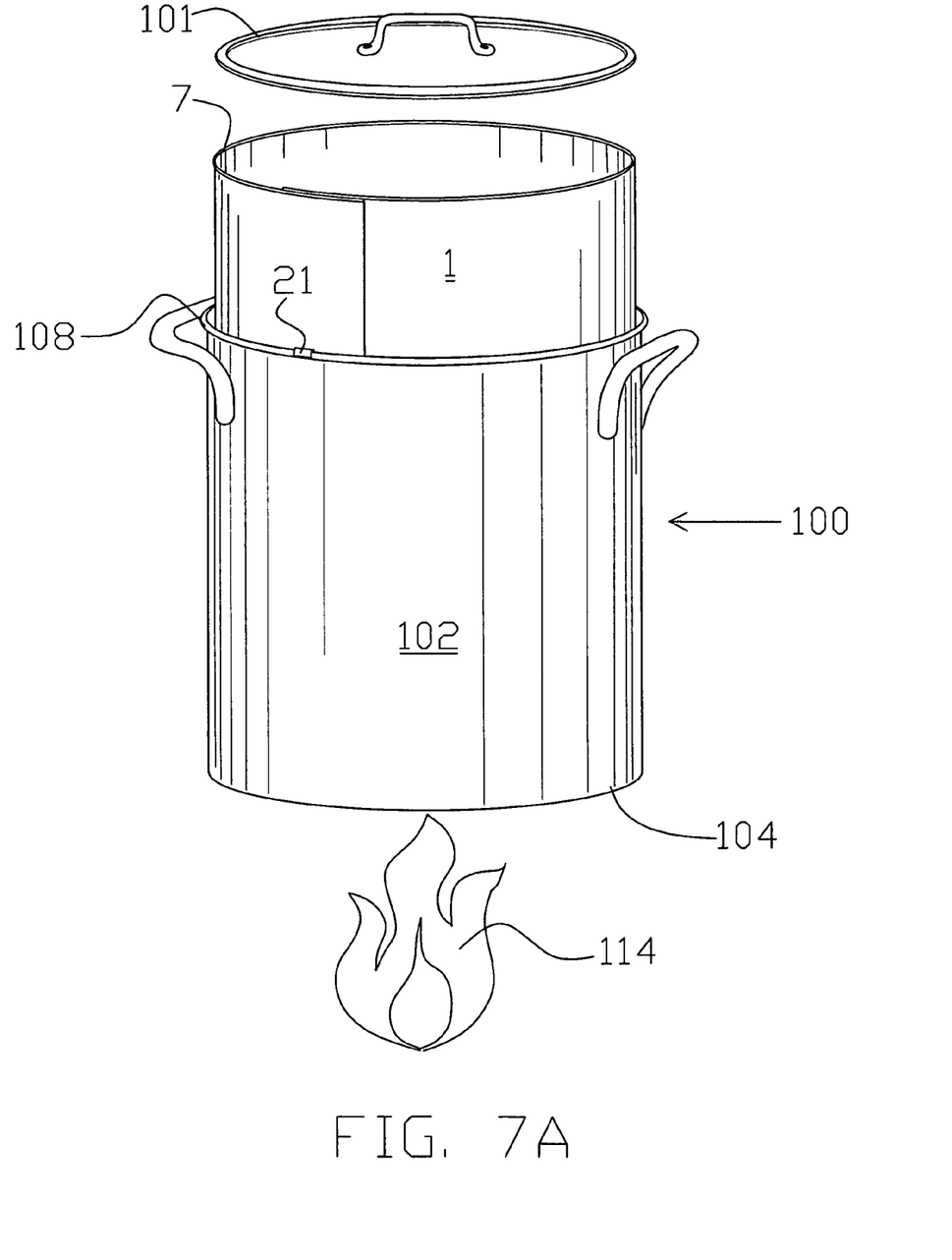
FIG. 7A is a perspective view of the shield shown assembled and installed in the fry pot.
Figure 7B:
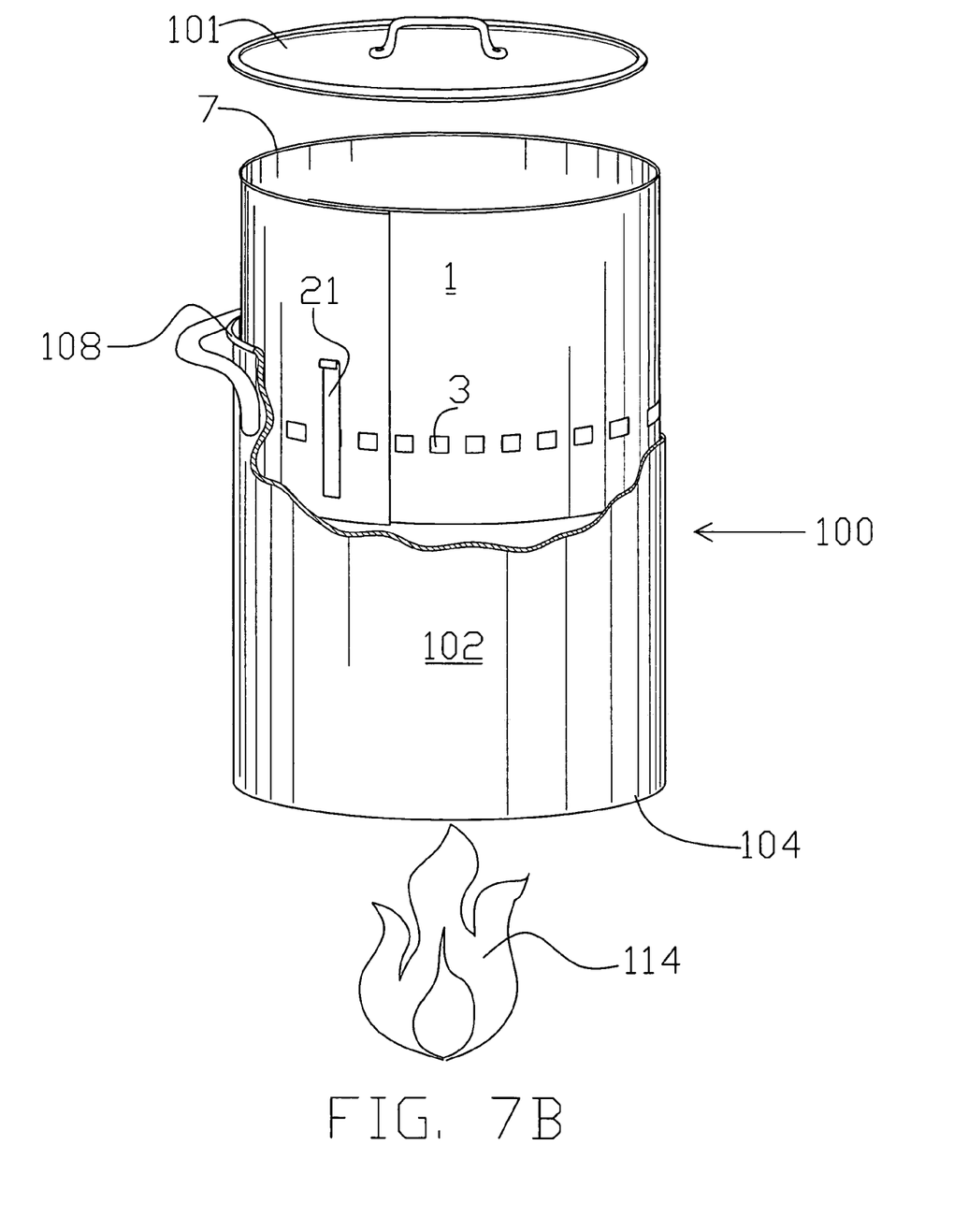
FIG. 7B is a partial cross-sectional view of FIG. 7A.

FIGS. 6 and 7 show how the shield 1 communicates with fry pot 100. FIG. 6 is a partial exploded view showing the shield 1 assembled but disengaged from the pot 100. The exterior radius of the shield $r_2$, as shown in FIG. 4B, is less than the interior radius of the fry pot $r_1$, as shown in FIG. 1C. It should be noted that radius $r_2$ is defined at a point where the two edges 9 overlap. Shield 1 is inserted into opening 106 such that curved edge 23 rests atop lip 108, as shown in FIGS. 7A and 7B. Lid 101 is then situated onto top 7 of shield 1. The outer radius $r_2$ varies from bottom 5 to top 7. The radius may vary because the material that comprises shield 1 is flexible or pliable and is secured near bottom 5 allowing overlapping edges 9 to slightly separate near the top 7. At top 7, the radius is large enough to allow lid 101 to be appropriately seated.

It is to be understood that the invention is not limited to the exact construction illustrated and described above. Various changes and modifications may be made without departing from the spirit and the scope of the invention as defined in the following claims.

I claim:

1. A shield that extends a sidewall of a fry pot to prevent a spillover of oil contained within the fry pot, said shield comprising:
   a pliable piece of fire resistant material having a top, a bottom and two ends and including a plurality of holes formed in a line near the bottom of the fire resistant material, said ends being overlapped to form a cylinder having two holes that overlap to prevent spillover of hot oil from within the shield and fry pot, such that a radius of the shield may be varied in size to accommodate different sized fry pots; and,
   at least one shield support having two curved surfaces, one of said curved surfaces passing through at least the two holes that overlap and the other of said curved surface resting on an upper edge of a sidewall of a fry pot, such that the plurality of holes are maintained below the upper edge of the sidewall of the fry pot.

2. The shield of claim 1 wherein said fire resistant material comprises sheet metal.

3. The shield of claim 1 wherein said fire resistant material comprises a rectangular sheet of fire resistant material.

4. The shield of claim 1 wherein a distance between the plurality of holes and the bottom of the shield is less than a distance between the plurality of holes and the top of the shield.

5. The shield of claim 1 wherein each hole that forms said plurality of holes is square in shape.

6. A fry pot system comprising:
   a fry pot that comprises a bottom, a sidewall including a lip that defines an opening and into which a oil is deposited and heated;
   a shield comprising a pliable piece of fire resistant material having a top, a bottom and two ends and including a plurality of holes formed in a line near the bottom of the fire resistant material, said ends being overlapped to form a cylinder having two holes that overlap to prevent spillover of hot oil from within the shield and fry pot, such that a radius of the shield may be varied in size to accommodate different sized fry pots; and,
   at least one shield support having two curved surfaces, one of said curved surfaces passing through at least the two holes that overlap and the other of said curved surface resting on the lip of the sidewall of the fry pot, such that the plurality of holes are maintained below the upper edge of the sidewall of the fry pot.

7. The fry pot system of claim 6 wherein said opening defined by the lip comprises a first radius that is larger than a radius defined by the shield.

8. The shield of claim 6 wherein said fire resistant material comprises sheet metal.

9. The shield of claim 6 wherein said fire resistant material comprises a rectangular sheet of fire resistant material.

10. The shield of claim 6 wherein a distance between the plurality of holes and the bottom of the shield is less than a distance between the plurality of holes and the top of the shield.

11. The shield of claim 6 wherein each hole that forms said plurality of holes is square in shape.

12. A fry pot shield that extends a sidewall of the fry pot, comprising:
   a rectangular piece of pliable, fire resistant material, said material comprising a first edge, a second edge, a top, a bottom and a plurality holes arranged parallel to the bottom of the material and formed in a line near the bottom of the fire resistant material, said first end being overlapped the second edge to form a cylinder having two holes that overlap to prevent spillover of hot oil from within the shield and fry pot, such that a radius of the shield may be varied in size to accommodate different sized fry pots; and,
   at least one shield support having two curved surfaces, one of said curved surfaces passing through at least the two holes that overlap and the other of said curved surface resting on a lip of a sidewall of the fry pot, such that the plurality of holes are maintained below the upper edge of the sidewall of the fry pot.

13. The fry pot system of claim 12 wherein said opening defined by the lip of the sidewall of the fry pot comprises a first radius that is larger than a radius defined by the shield.

14. The shield of claim 12 wherein said fire resistant material comprises sheet metal.

15. The shield of claim 12 wherein said fire resistant material comprises a rectangular sheet of fire resistant material.

16. The shield of claim 12 wherein a distance between the plurality of holes and the bottom of the shield is less than a distance between the plurality of holes and the top of the shield.

17. The shield of claim 12 wherein each hole that forms said plurality of holes is square in shape.

* * * * *